(12) United States Patent
Lin et al.

(10) Patent No.: US 12,350,592 B1
(45) Date of Patent: Jul. 8, 2025

(54) VIDEO GAME SESSION MANAGEMENT ON NON-FIXED COMPUTER HOSTING TOPOLOGIES

(71) Applicant: Amazon Technologies, Inc., Seattle, WA (US)

(72) Inventors: Kenneth Beony Lin, Seattle, WA (US); Joseph Richard Thompson, Austin, TX (US); Jonathan Robert Bush, Port Orchard, WA (US); Alexander Lambertus Eusman, Seattle, WA (US); Joshua Joseph Clark, Seattle, WA (US); Brian Francis Lee, Seattle, WA (US); Brian J. Schuster, Seattle, WA (US); Xiaoshu Lu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 408 days.

(21) Appl. No.: 18/060,243

(22) Filed: Nov. 30, 2022

(51) Int. Cl.
| | |
|---|---|
| A63F 13/77 | (2014.01) |
| A63F 13/335 | (2014.01) |
| A63F 13/35 | (2014.01) |
| A63F 13/352 | (2014.01) |

(52) U.S. Cl.
CPC ............ *A63F 13/77* (2014.09); *A63F 13/335* (2014.09); *A63F 13/35* (2014.09); *A63F 13/352* (2014.09); *A63F 2300/407* (2013.01); *A63F 2300/513* (2013.01); *A63F 2300/531* (2013.01)

(58) Field of Classification Search
CPC ........ A63F 13/77; A63F 13/335; A63F 13/35; A63F 13/352; A63F 2300/407; A63F 2300/513; A63F 2300/531
See application file for complete search history.

(56) References Cited

U.S. PATENT DOCUMENTS

| | | | | |
|---|---|---|---|---|
| 9,211,473 | B2* | 12/2015 | Pereira | A63F 13/358 |
| 10,026,070 | B2* | 7/2018 | Thorpe | G06Q 10/0631 |
| 10,335,691 | B2* | 7/2019 | Sullivan | A63F 13/355 |
| 10,456,673 | B1* | 10/2019 | Leung | A63F 13/358 |
| 10,486,064 | B2* | 11/2019 | Gary | A63F 13/30 |
| 10,713,072 | B1* | 7/2020 | Burgin | H04L 41/0895 |
| 10,967,274 | B1* | 4/2021 | Schuster | G06F 9/5083 |
| 10,987,597 | B2* | 4/2021 | Sullivan | A63F 13/795 |
| 10,994,198 | B1* | 5/2021 | Byskal | G06F 9/50 |
| 11,013,995 | B2* | 5/2021 | Perry | A63F 13/71 |
| 11,065,552 | B2* | 7/2021 | Perlman | H04N 21/4781 |
| 11,247,135 | B2* | 2/2022 | van der Laan | H04N 21/2385 |

(Continued)

*Primary Examiner* — William H McCulloch, Jr.
(74) *Attorney, Agent, or Firm* — BakerHostetler

(57) ABSTRACT

A request to create a game fleet may be received by a game session management service. The game session management service may manage a fixed host fleet type and a non-fixed host fleet type, wherein the fixed host fleet type allows game server execution only on a fixed host topology of a computing service provider affiliated with the game session management service, and wherein the non-fixed host fleet type allows game server execution on any host topology. The request may indicate that the first game fleet has the non-fixed host fleet type. A host registration request to register a host to the first game fleet may be received. A process registration request to register a game server process executing on the host may be received. The game session management service may communicate with the game server process executing on the host via a designated communications interface.

20 Claims, 8 Drawing Sheets

(56) References Cited

U.S. PATENT DOCUMENTS

| | | | |
|---|---|---|---|
| 11,465,045 B1* | 10/2022 | Buliani | H04L 67/56 |
| 11,504,617 B2* | 11/2022 | Pare | A63F 13/335 |
| 11,571,618 B1* | 2/2023 | Schuster | A63F 13/335 |
| 11,571,619 B1* | 2/2023 | Schuster | A63F 13/352 |
| 11,684,849 B2* | 6/2023 | Buser | A63F 13/355 |
| | | | 463/42 |
| 11,801,449 B2* | 10/2023 | Perlman | A63F 13/352 |
| 11,872,497 B1* | 1/2024 | Schuster | A63F 13/77 |
| 11,943,281 B2* | 3/2024 | Colenbrander | A63F 13/35 |
| 12,008,412 B2* | 6/2024 | Shetty | G06F 9/5055 |
| 2016/0034835 A1* | 2/2016 | Levi | H04L 67/10 |
| | | | 705/7.23 |
| 2020/0230499 A1* | 7/2020 | Buser | H04L 43/04 |

\* cited by examiner

VIDEO GAME SESSION MANAGEMENT ON NON-FIXED COMPUTER HOSTING TOPOLOGIES

BACKGROUND

A video game session management service may provide a number of valuable features to customers. For example, a video game session management service may assist in managing and optimizing operations such as creation of game sessions, adding players to game sessions, player matchmaking, reporting of metrics and many others. However, one problematic feature of game session management services is that they may limit managed game servers to being hosted on a fixed hosting topology, such as a specific cloud computing service that is affiliated with the game session management service. This may be problematic, for example, for scenarios in which customers want to use a game session management service in combination with other hosting topologies, such as a customer's on-premises compute, rented hardware, or another (e.g., third-party) cloud service provider that is not affiliated with the game session management service. Another corresponding problem is that a game session management service may require a number of time-consuming operations to be performed when deploying game server updates to a fixed hosting topology. These operations may include, for example, uploading of a build to the game session management service, machine image creation, stack creation, virtual network creation, autoscaling group creation, security group creation and others. While these operations may provide a number of advantages, they may also increase the time required to iterate and test new versions of a game during the development process.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
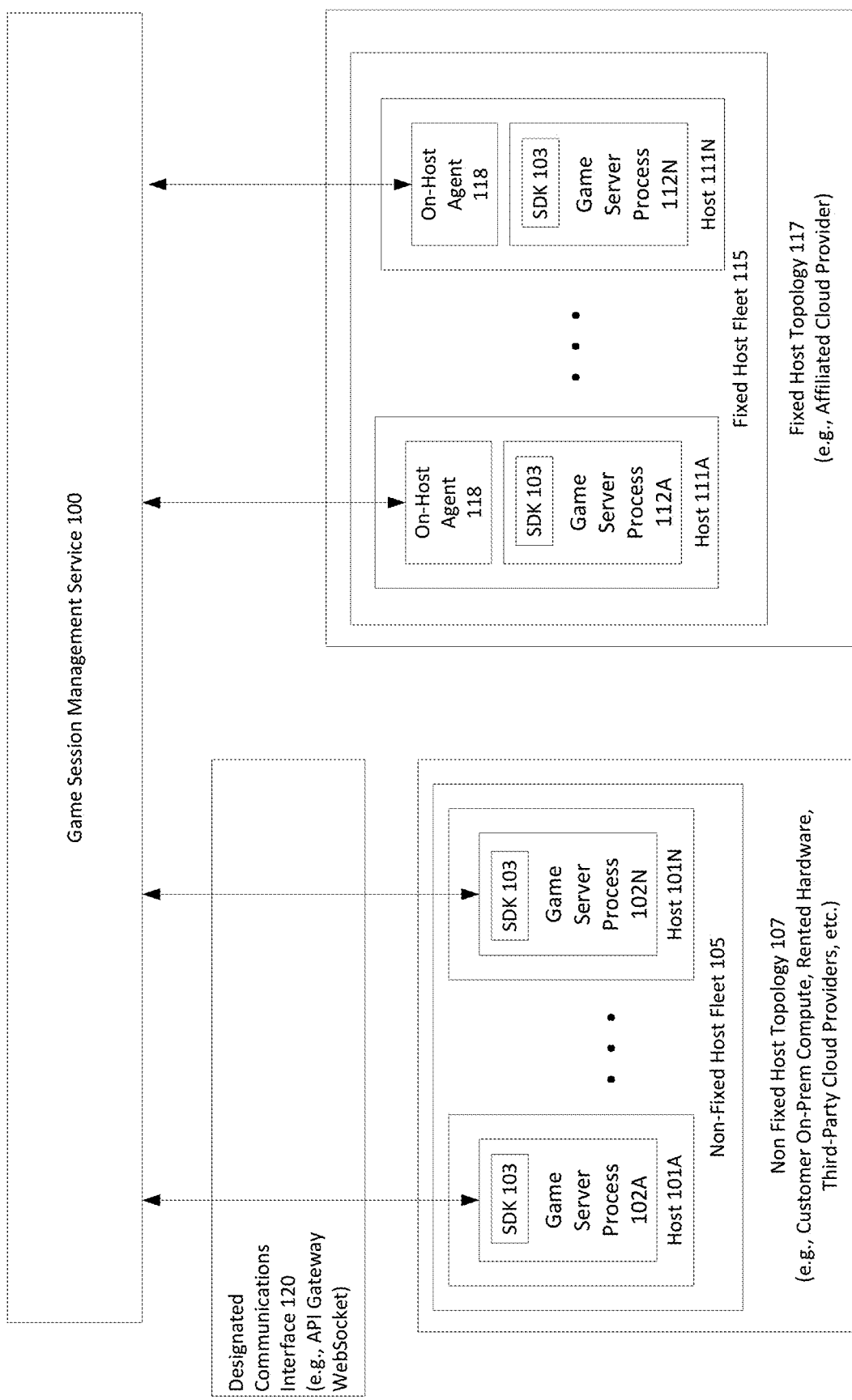
FIG. 1 is a diagram illustrating an example video game session management system that may be used in accordance with the present disclosure.

Techniques for video game session management on non-fixed computer hosting topologies are described herein. The techniques described herein may allow a game session management service to manage game sessions being executed on any hosting topology, including those not directly affiliated with the game session management service. For example, the techniques described herein may allow a game session management service to manage game sessions being executed on a customer's on-premises compute, rented hardware, or another (e.g., third-party) cloud service provider that is not affiliated with the game session management service. In some examples, a game session management service may support fixed host game fleets as well as non-fixed host game fleets. A game fleet (also referred to simply as a fleet), as that term is used herein, refers to a set of hosts that execute a common game server executable. Fixed host fleets may allow game server execution only on a fixed host topology, such as a specific cloud computing service that is affiliated with the game session management service. By contrast, non-fixed host fleets may allow game server execution on any number of varied host topologies, for example including a customer's on-premises compute, rented hardware, or another (e.g., third-party) cloud service provider that is not affiliated with the game session management service.

There may be various differences in the ways that fixed host fleets and non-fixed host fleets are managed. For example, for fixed host fleets, the game session management service may provide an on-host agent that manages game server processes and communicates with the game session management service. By contrast, for non-fixed host fleets, game server processes may instead communicate directly with the game session management service through a designated communications interface, such as a websocket connection of an application programming interface (API) gateway service. Additionally, for fixed host fleets, hosts may be automatically registered to a fleet without customer intervention. By contrast, for non-fixed host fleets, customers may be responsible for registering hosts to a fleet.

In some examples, when a customer issues a request to create a fleet, the customer may indicate a fleet type (e.g., fixed host or non-fixed host) for the new fleet. The game session management service may return, to the customer, a corresponding fleet identifier (ID) for the requested fleet. For a non-fixed host fleet, after requesting fleet creation, a customer may register one or more hosts to the fleet. A host, as that term is used herein, is a computer hardware and/or computer software (executing on computer hardware) unit that executes one or more game server processes. A host may include, for example, a personal computer (e.g., laptop, tablet, etc.), a game console, a server, one or more virtual machine instances and/or other computing units capable of executing one or more game server processes. When registering a host, the customer may provide the fleet ID for the fleet to which the host is being registered.

For a non-fixed host fleet, in response to a customer's registration of a host, the game session management service may request and receive information (e.g., an endpoint uniform resource locator (URL)) regarding a designated communications interface (e.g., an API gateway service websocket connection) for the fleet. The game session management service may then return the communications interface information to the customer. A game server process on a registered host may then connect to the designated communications interface using the information provided by the game session management service. In some examples, in order to connect to the designated communications interface, an authorization procedure may be performed. Specifically, the customer may be required to provide authorization data, such as an authorization token, in order to connect to the designated communications interface. Also, in some examples, the authorization data (e.g., token) may be provided to the customer based on validation of authorization credentials that may be provided by the customer. Upon successful authorization, a game server process may connect to the designated communications interface to communicate with the game session management service.

The game session management service may expose a software development kit (SDK) that may be employed by game developers to assist in creation of game servers and to allow the game servers to interact with the game session management service, for example via an API of the game session management service. The game server process may use the designated communication interface to issue calls to the game session management service, such as via the game session management service SDK and API, for example including calls to indicate that a game server process is ready to host game sessions, calls to end game server processes, calls to activate a game session, calls to accept or remove a player session, and many others that will be readily apparent to a person of ordinary skill in the art. Additionally, the game session management service may use the designated communications interface to send communications to the game server process, such as to issue responses to any of the above or other API calls, to issue requests to start a game session, and many others.

The game session management service may provide a game session queue that allows game sessions to be placed globally across multiple fleets. In some examples, the game session queue may optimize game session placements across multiple fleets based on a priority associated with factors such as cost, latency, resources available from the different fleets, and/or others. In some cases, a customer may assign one or more fixed host fleets and also one or more non-fixed host fleets to a single game session queue. Also, in some examples, the customer may indicate a priority associated with executing game sessions on a non-fixed host fleet. This may allow optimized placement of game sessions based at least in part on the priority. In one specific example, cost may be used as an example prioritization factor. For example, in some cases, it may be less expensive for the customer to host game sessions on a non-fixed host fleet than on fixed host fleets. In these cases, the customer may set the priority for the non-fixed host fleet to be higher than the priority of the fixed host fleets. This may, for example, allow game sessions to be created on the non-fixed host fleet when there is available capacity, and then allow overflow game sessions to be created on the fixed host fleets when the non-fixed host fleet is at full capacity. In other examples, the customer may set the priority of non-fixed host fleet to be higher than some fixed host fleets (e.g., on-demand instance fleets) but not as high as other fixed host fleets (e.g., spot instance fleets).

Another example difference between fixed host fleets and non-fixed host fleets is that non-fixed host fleets may allow a shorter iteration time for iterating between game server updates during the development process. Specifically, in some examples, a game session management service may require a number of time-consuming operations to be performed when deploying game server updates to a fixed hosting topology. These operations may include, for example, uploading of a build to the game session management service, machine image creation, stack creation, virtual network creation, autoscaling group creation, security group creation and others. While these operations may provide a number of advantages, they may also increase the time required to iterate and test new versions of a game during the development process. By contrast, because non-fixed host topologies may be out of the control of the game session management service, the game session management service may not require the above operations to be performed when games are executed on non-fixed host topology. In some examples, for non-fixed host fleets, an updated game may be executed, for example on a customer's personal computer, simply by re-registering an updated game server process with the game session management service. Thus, in some cases, the use of non-fixed host fleets may substantially reduce the time required to iterate and test new versions of a game during the development process.

Thus, the use of non-fixed host fleets may provide a number of advantages to customers, such as by allowing customers to use alternative host topologies in scenarios when those host topologies may be less expensive and/or more efficient for customers than a fixed host topology affiliated with the game session management service. This may be particularly advantageous in some scenarios in which a customer has already purchased (e.g., via a pre-obtained contract) alternative host topologies, or when a customer is in the process of migrating from alternative host topologies to the fixed host topology. Additionally, the use of non-fixed host topologies may substantially reduce the time required to iterate and test new versions of a game during the development process.

FIG. 1 is a diagram illustrating an example video game session management system that may be used in accordance with the present disclosure. In the example of FIG. 1, game session management service 100 manages game sessions on a fixed host fleet 115 and a non-fixed host fleet 105. As should be appreciated, although only a single fixed host fleet (fixed host fleet 115) and a single non-fixed host fleet (non-fixed host fleet 105) are shown in FIG. 1, the game session management service 100 may manage game sessions on any number of additional fixed host fleets and/or non-fixed host fleets. Fixed host fleet 115 allows game server execution only on a fixed host topology 117, such as a specific cloud computing service that is affiliated with the game session management service. By contrast, non-fixed host fleet 105 allows game server execution on a non-fixed host topology 117. Non-fixed host topology 117 may be any hosting topology, for example including, but not limited to, a customer's on-premises compute, rented hardware, or another (e.g., third-party) cloud service provider that is not affiliated with the game session management service. As referred to herein, a single cloud service provider is considered to constitute a single host topology. By contrast, different cloud service providers are considered to constitute different hosting topologies. In some examples, when requesting creation of non-fixed host fleet 105, a customer may issue, to the game session management service 100, a fleet creation request indicating that the fleet being created will be a non-fixed host type fleet. By contrast, when requesting creation of fixed host fleet 115, the customer may issue, to the game session management service 100, a fleet creation request indicating that the fleet being created will be a fixed host type fleet.

In the example of FIG. 1, non-fixed host fleet includes hosts 101A-N. Each host 101A-N executes a game server process 102A-N, respectively. In some examples, each host 101A-N may also optionally execute any number of additional game server processes (not shown in FIG. 1). As also shown in FIG. 1, fixed host fleet 115 includes hosts 111A-N. Each host 111A-N executes a game server process 112A-N, respectively. In some examples, host 111A-N may also optionally execute any number of additional game server processes (not shown in FIG. 1). In this example, the game session management service exposes an SDK 103 that may be employed by game developers to assist in creation of game server processes 102A-N and 112A-N and to allow the game server processes 102A-N and 112A-N to interact with the game session management service 100, for example via an API of the game session management service 100.

There may be various differences in the ways that fixed host fleet 115 and non-fixed host fleet 105 are managed. For example, for fixed host fleet 115, the game session management service 100 provides on-host agent 118 that manages game server processes 112A-N and communicates with the game session management service 100. By contrast, for non-fixed host fleet 105, game server processes 102A-N instead communicate directly with the game session management service 100 through a designated communications interface 120, such as a websocket connection of an application programming interface (API) gateway service. Additionally, for fixed host fleet 115, hosts 111A-N may be automatically registered to the fixed host fleet 115 without customer intervention. By contrast, for non-fixed host fleet 105, a customer may be responsible for registering hosts 101A-N to the non-fixed host fleet 105.

Specifically, for non-fixed host fleet 105, in response to a customer's registration of a host 101A-N, the game session management service 100 may request and receive information regarding the designated communications interface 120. For example, the game session management service may contact an API gateway service to request and receive information (e.g., an endpoint URL) for an API gateway websocket connection for the non-fixed host fleet 105. The game session management service 100 may then return the communications interface information to the customer. A game server process 102A-N on a host 101A-N may then connect to the designated communications interface 120 using the information provided by the game session management service 100.

In some examples, in order to connect to the designated communications interface 120, an authorization procedure may be performed. Specifically, the customer may be required to provide authorization data, such as an authorization token, in order to connect to the designated communications interface 120. Also, in some examples, the authorization data (e.g., token) may be provided to the customer based on validation of authorization credentials that may be provided by the customer. For example, the customer may be required to provide authorization credentials to a computing service provider that operates the API gateway service. Upon successful authorization, a game server process 102A-N may connect to the designated communications interface 120 to communicate with the game session management service 100.

In the example of FIG. 1, game server processes 102A-N and 112A-N employ SDK 103 of the game session management service 100 to interact with the game session management service 100, for example via an API of the game session management service 100. For example, game server process 102A-N may use the designated communication interface 120 to issue API calls to the game session management service 100, via the SDK 103, for example including calls to indicate that a game server process 102A-N is ready to host game sessions, calls to end a game server process 102A-N, calls to activate a game session, calls to accept or remove a player session, and many others. Additionally, the game session management service 100 may use the designated communications interface to send communications to the game server processes 102A-N, such as to issue responses to any of the above or other API calls, to issue requests to start a game session, and many others.

As described above, in the example of FIG. 1, for fixed host fleet 115, the game session management service 100 provides on-host agent 118 that manages game server processes 112A-N and communicates with the game session management service 100. It is noted, however, that there is no requirement that all fixed host fleets must perform communications with the game session management service via an on-host agent 118. For example, in some cases, game server processes in a fixed host fleet may optionally communicate directly with the game session management service 100, such as via a websocket connection of an API gateway service. In some scenarios, this may be advantageous because it may allow game server processes on both fixed host fleets and non-fixed host fleets to communicate in the same manner. In some examples, for scenarios in which game server processes in a fixed host fleet communicate directly with the game session management service 100, the game session management service 100 may provide a new on-host agent that assists with operations such as launching the game server processes and monitoring the game server process to ensure that they remain healthy and active. This new on-host agent may optionally be released publicly to ease customer development.

Figure 2:
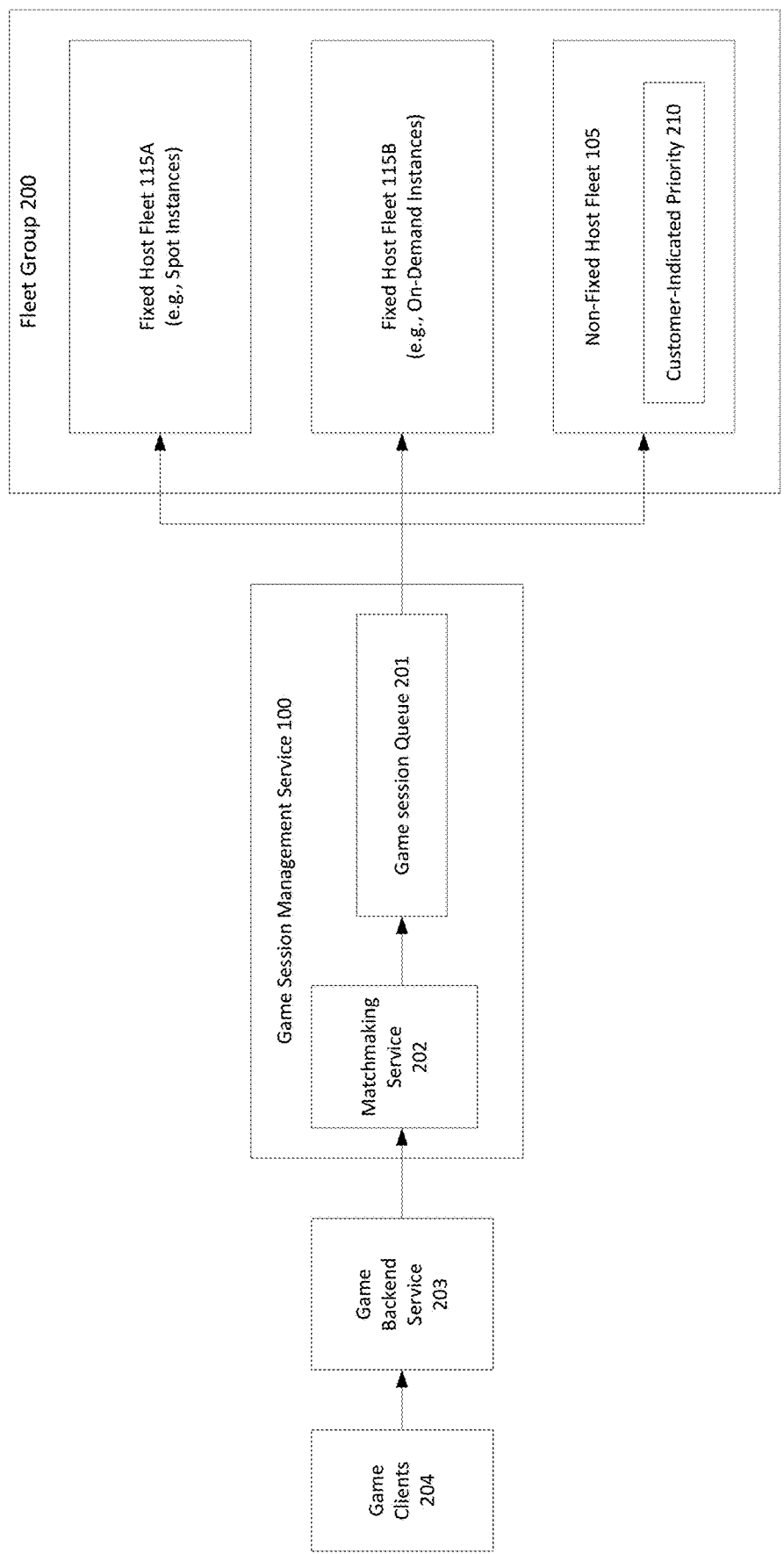
FIG. 2 is a diagram illustrating an example game session queueing system that may be used in accordance with the present disclosure.

Referring now to FIG. 2, an example game session queueing system will now be described in detail. As shown in FIG. 2, the game session management service 100 provides a game session queue 201 that allows game sessions to be placed globally across a fleet group 200. In this example, the fleet group 200 includes fixed host fleets 115A-B and non-fixed host fleet 115. As shown in FIG. 2, players may join game sessions via game clients 204. In this example, game session management service 100 provides a matchmaking service 202, which may match players into new game sessions based on a defined set of matchmaking rules, such as may be defined by a customer of the game session management service 100. Matchmaking requests for the new players may be received by matchmaking service 202 via game backend service 203. When the matchmaking service 202 matches players into a new game session, a request for the new game session may be enqueued into game session queue 201. In some examples, the game session queue 201 may optimize game session placements across fleet group 200 based on a priority associated with factors such as cost, latency, resources available from the different fleets, and/or others.

In one specific example, fixed host fleet 115A may be a fleet of spot instance hosts. The term spot instance, as used herein, refers to computing capacity (e.g., virtual machine instances) provided to a customer, by a computing service provider, based on unused capacity (e.g., a percentage of available and/or unavailable capacity) of the computing service provider at a given time. Because spot instances are based on unused capacity, which can change from moment to moment, spot instances may also be reclaimable, meaning that the computing service provider can reclaim spot instances if the capacity is needed to service on-demand workflows. Also, in one specific example, fixed host fleet 115B may be a fleet of on-demand instance hosts. The term on-demand instance, as used herein, refers to computing capacity (e.g., virtual machine instances) provided to a customer, by a computing service provider, at a cost based on an amount of time that the computing capacity is used. Because spot instances are made available to customers based on the computing service provider's capacity, the cost for spot instances is typically less than the cost for on-demand instances.

Figure 3:
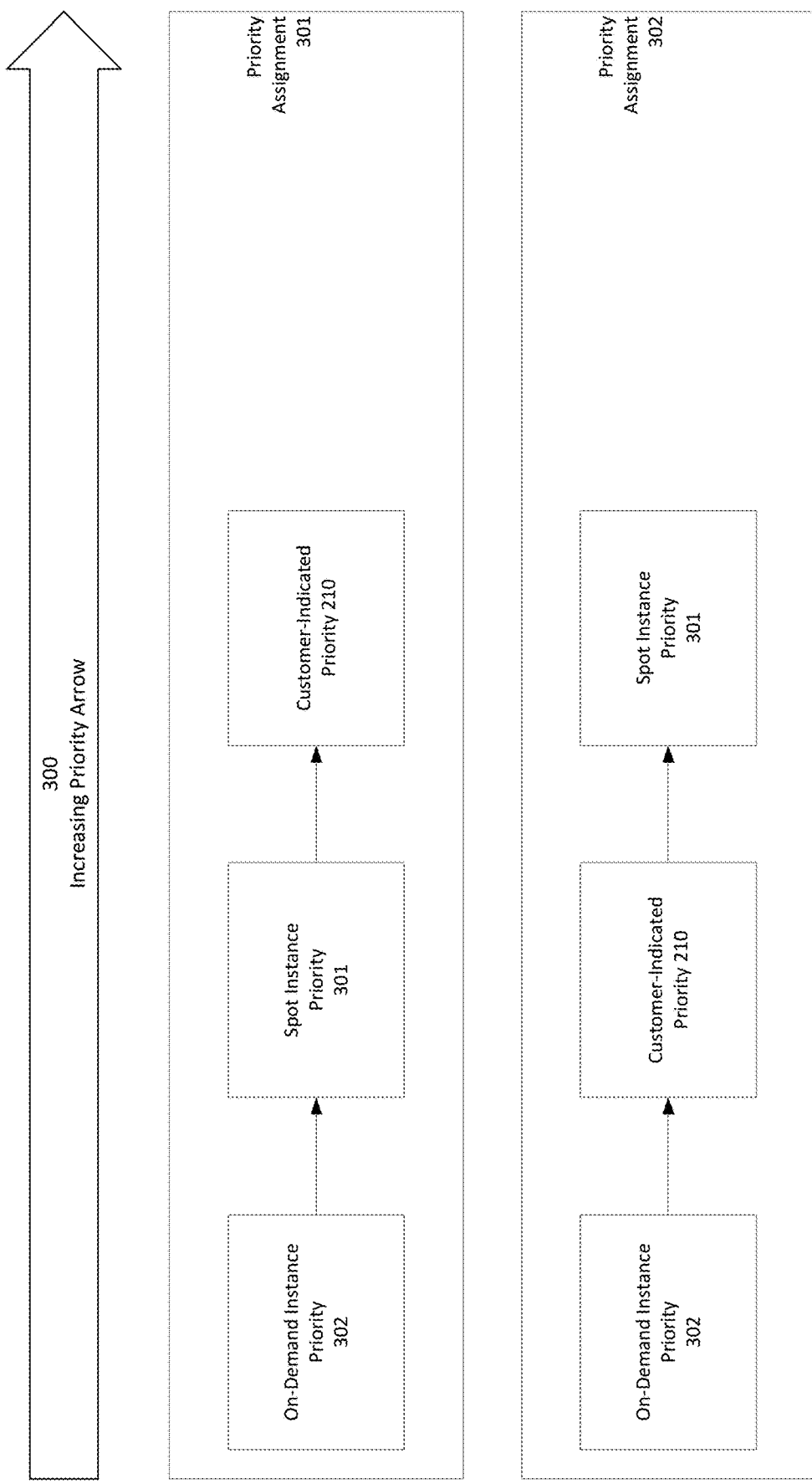
FIG. 3 is a diagram illustrating example fleet priority assignments that may be used in accordance with the present disclosure.

As shown in FIG. 2, a customer may specify a customer-indicated priority 210 associated with executing game sessions on the non-fixed host fleet 105. This may allow game session queue 201 to optimize placement of game sessions based at least in part on factors such as cost, latency, resources available from the different fleets, and/or others. In some examples, each request may have a different priority associated with it. For example, the customer may only want to use spot instances if a specific threshold has been reached for the on-demand instances because spot instances are reclaimable. Alternatively, the customer may indicate to prioritize a fleet that would provide the least amount of latency. Referring now to FIG. 3, some examples of priority scenarios will now be described in detail. In the example of FIG. 3, representations of priority increase from left to right, as indicated by increasing priority arrow 300. Specifically, priority assignment 301 represents a first scenario in which the customer may set the customer-indicated priority 210 for the non-fixed host fleet to be higher than the spot index priority 301 (for fixed host fleet 115A) and the on-demand instance priority 302 (for fixed host fleet 115B). This is represented in priority assignment 301 by showing the customer-indicated priority 210 to the right of both the spot index priority 301 and the on-demand instance priority 302 (with priorities increasing from left to right). This may, for example, allow game sessions to be created on the non-fixed host fleet 105 when there is available capacity, and then allow overflow game sessions to be created on the fixed host fleets 115A-B when the non-fixed host fleet is at full capacity. In one specific example, prioritization may be based on cost, and priority assignment 301 may represent an example scenario in which it is less expensive to host game sessions on non-fixed host fleet than 105 than on fixed host fleet 115A (including spot instances) and on fixed host fleet 115B (including on-demand instances). Also, in this example scenario, the customer may specify the customer-indicated priority 210 by indicating that the non-fixed host fleet has a lower cost (and therefore a higher priority) than the fixed host fleets 115A-B.

Priority assignment 302 represents a second scenario in which the customer may set the customer-indicated priority 210 for the non-fixed host fleet to be higher than the on-demand instance priority 302 (for fixed host fleet 115B)—but lower than the spot index priority 301 (for fixed host fleet 115A). This is represented in priority assignment 302 by showing the customer-indicated priority 210 to the right of the on-demand instance priority 302 and to the left of the spot index priority 301 (with priorities increasing from left to right). This may, for example, allow game sessions to be created on the fixed host fleet 115A (including spot instances) when there is available capacity, and then allow overflow game sessions to be created on the non-fixed host fleet 105. Additionally, when there is no available capacity on the fixed host fleet 115A or the non-fixed host fleet 105, additional overflow game sessions may then be created on the fixed host fleet 115B. In one specific example, prioritization may be based on cost, and priority assignment 302 may represent an example scenario in which it is less expensive to host game sessions on non-fixed host fleet 105 than on fixed host fleet 115B (including on-demand instances)—but more expensive to host game sessions on non-fixed host fleet than 105 than on fixed host fleet 115A (including spot instances). Also, in this example scenario, the customer may specify the customer-indicated priority 210 by indicating that the non-fixed host fleet has a lower cost (and therefore a higher priority) than fixed host fleet 115B (including on-demand instances) but a higher cost (and therefore a lower priority) than fixed host fleet 115A (including spot instances).

Figure 4:
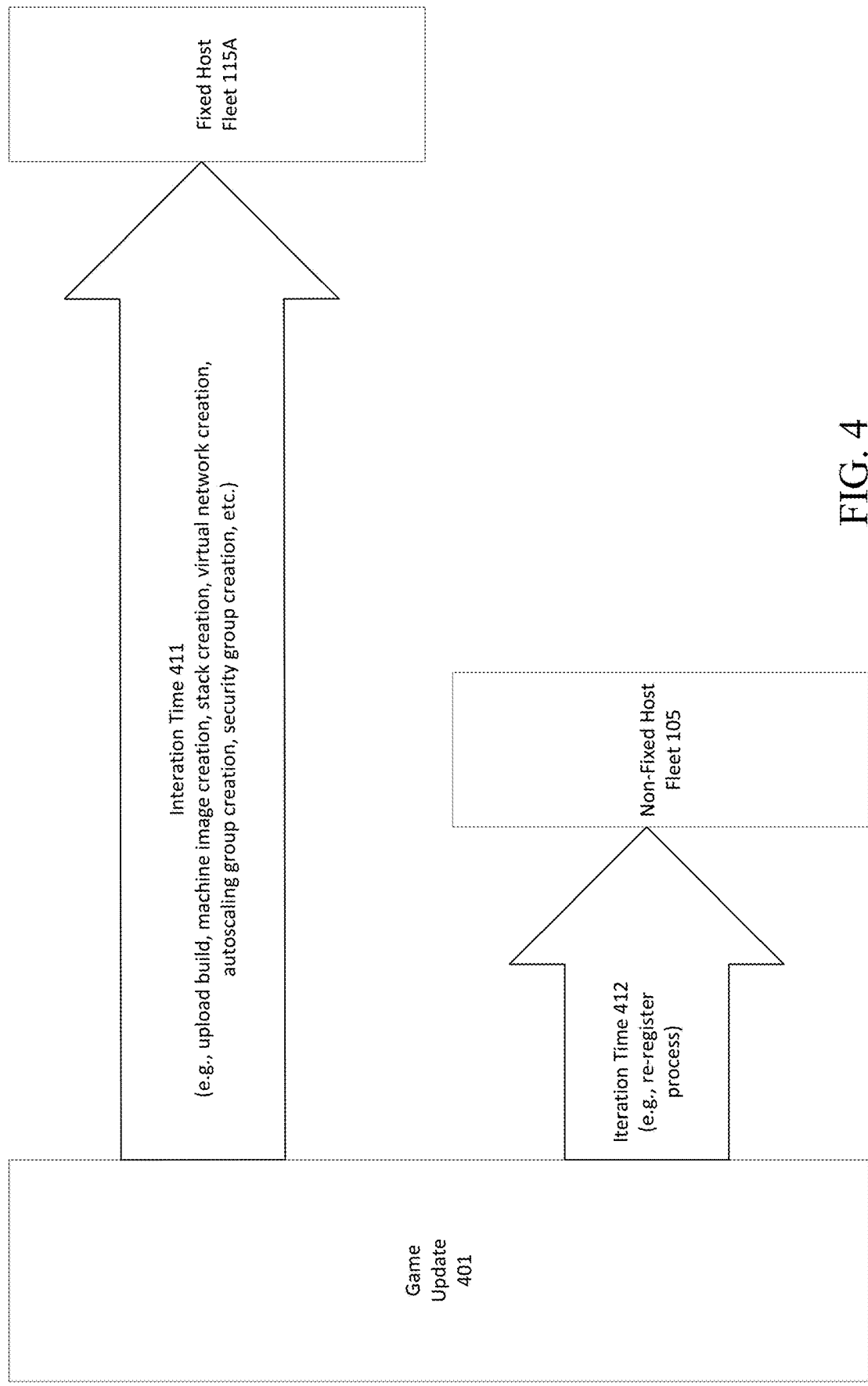
FIG. 4 is a diagram illustrating an example fleet iteration times that may be used in accordance with the present disclosure.

As described above, another example difference between a fixed host fleet 115 and non-fixed host fleet 105 is that the non-fixed host fleet 105 may allow a shorter iteration time for iterating between game server updates during the development process. Referring now to FIG. 4, some example game update iterations will now be described in detail. In the example of FIG. 4, game update 401 represents a game server process that has been updated (e.g., debugged) from a previous iteration of the game server process and is ready for testing. Iteration time 411 represents the time required to prepare the game update 401 for deployment and to deploy the game update 401 on the fixed host fleet 415. As shown, iteration time 411 may include time required to perform a number of operations that are required, by the game session management service 100, for deployment of game update 401 to fixed host fleet. These mandatory operations may include, for example, uploading of a build to the game session management service 100, machine image creation, stack creation, virtual network creation, autoscaling group creation, security group creation and others. While these operations may provide a number of advantages, they may also increase the time required to iterate and test new versions of a game during the development process.

As also shown in FIG. 4, iteration time 412 represents the time required to prepare the non-fixed host fleet 115 to execute the game update 401. Because non-fixed host topology 107 may be out of the control of the game session management service 100, the game session management service 100 may not require the operations included in iteration time 411 to be performed when games are executed on the non-fixed host fleet 105. In some examples, for non-fixed host fleet 105, game update 401 may be executed, for example on a customer's personal computer, simply by re-registering an updated game server process with the game session management service 100. Thus, in the example of FIG. 4, iteration time 412 (for non-fixed host fleet 105) is shorter than iteration time 411 (for fixed host fleet 115). Thus, the use of non-fixed host fleet 105 may substantially reduce the time required to iterate and test new versions of a game during the development process.

Figure 5:
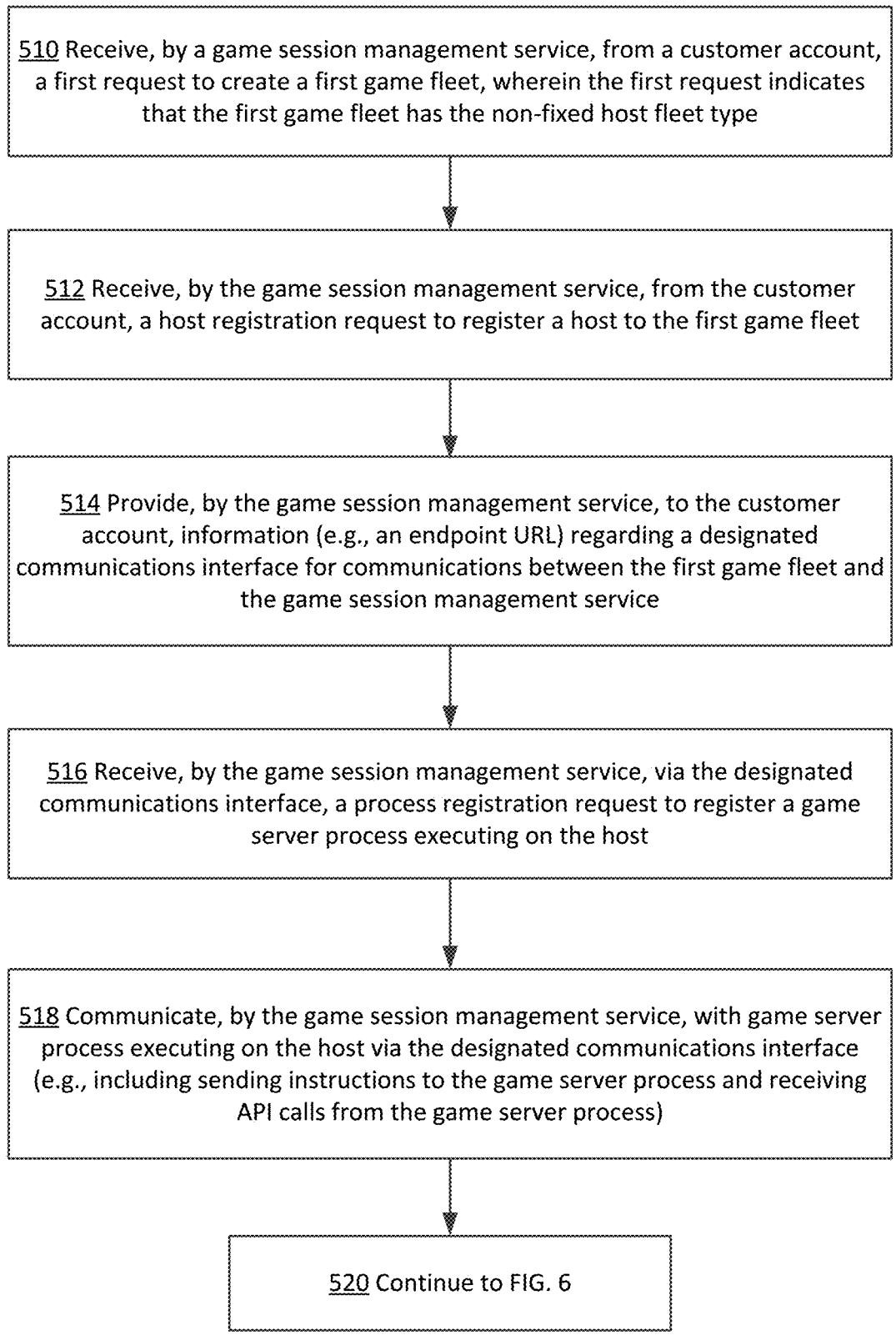
FIG. 5 is a flowchart illustrating an example video game session management process that may be used in accordance with the present disclosure.

FIG. 5 is a flowchart illustrating an example video game session management process that may be used in accordance with the present disclosure. At operation 510, a first request to create a first game fleet is received, by a game session management service, from a customer account, wherein the first request indicates that the first game fleet has the non-fixed host fleet type. The game session management service may manage a fixed host fleet type and a non-fixed host fleet type. The fixed host fleet type may allow game server execution only on a fixed host topology of a computing service provider affiliated with the game session management service. A computing service provider may be affiliated with the game session management service by having a business relationship with the game session management service, for example by wholly or partially owning or being wholly or partially commonly owned with the game session management service. By contrast, the non-fixed host fleet type allows the game server execution on any host topology.

As described above with reference to FIG. 1, game session management service 100 manages game sessions on a fixed host fleet 115 and a non-fixed host fleet 105. Fixed host fleet 115 allows game server execution only on a fixed host topology 117, such as a specific cloud computing service that is affiliated with the game session management service. By contrast, non-fixed host fleet 105 allows game server execution on a non-fixed host topology 117. Non-fixed host topology 117 may be any hosting topology, for example including, but not limited to, a customer's on-premises compute, rented hardware, or another (e.g., third-party) cloud service provider that is not affiliated with the game session management service. In some examples, when requesting creation of non-fixed host fleet 105, a customer may issue, to the game session management service 100, a fleet creation request indicating that the fleet being created will be a non-fixed host type fleet. By contrast, when requesting creation of fixed host fleet 115, the customer may issue, to the game session management service 100, a fleet creation request indicating that the fleet being created will be a fixed host type fleet. For example, in some cases, the game session management service may optionally receive, from the customer account, a second request to create a second game fleet, wherein the second request indicates that the second game fleet has the fixed host fleet type.

At operation 512, a host registration request to register a host to the first game fleet is received, by the game session management service, from the customer account. In some examples, in response to receipt of the first request to create the first game fleet (at operation 510), the game session management service may return, to the customer account, a fleet identifier (ID) that may be used to reference the first game fleet. In some examples, when registering the host, the customer may provide the fleet ID for the first game fleet as part of the host registration request. This may allow the host to be successfully registered to the first game fleet (e.g., as opposed to other fleets that may be managed by the game sessions management service). It is noted that operation 512 may be repeated any number of times for any number of additional hosts that may also optionally be registered to the first game fleet.

At operation 514, the game session management service provides, to the customer account, information regarding a designated communications interface for communications between the first game fleet and the game session management service. As described above with reference to FIG. 1, for fixed host fleet 115, the game session management service 100 provides on-host agent 118 that manages game server processes 112A-N and communicates with the game session management service 100. By contrast, for non-fixed host fleet 105, game server processes 102A-N instead communicate directly with the game session management service 100 through a designated communications interface 120, such as a websocket connection of an application programming interface (API) gateway service.

In response to registration of a host 101A-N with non-fixed host fleet 105, the game session management service 100 may request and receive information regarding the designated communications interface 120. For example, the game session management service 100 may contact an API gateway service to request and receive information (e.g., an endpoint URL) for an API gateway websocket connection for the non-fixed host fleet 105. The game session management service 100 may then return the communications interface information to the customer.

At operation 516, a process registration request to register a game server process executing on the host is received, by the game session management service, via the designated communications interface. The process registration request may be a request to register the game server process with the game session management service, for example to signal that the game server process is ready for game sessions. In some examples, upon receipt of the process registration request, the game management service may set a status for the game server process to active. The process registration request may be received via the designated communications interface. For example, upon receiving the information (e.g., an endpoint URL) for the designated communications interface (which may be provided at operation 514), a game server process may use this information to connect to the designated communications interface. As described above with reference to FIG. 1, in order to connect to the designated communications interface 120, an authorization procedure may be performed. Specifically, the customer may be required to provide authorization data, such as an authorization token, in order to connect to the designated communications interface 120. Also, in some examples, the authorization data (e.g., token) may be provided to the customer based on validation of authorization credentials that may be provided by the customer. For example, the customer may be required to provide authorization credentials to a computing service provider that operates the API gateway service. Upon successful authorization, a game server process 102A-N may connect to the designated communications interface 120.

At operation 518, the game session management service communicates with the game server process executing on the host via the designated communications interface. Operation 520 may include issuing, by the game session management service, management instructions to the game server process. Operation 520 may also include receiving, by the game session management service, messages from the game server process. As described above, with reference to FIG. 1, game server processes 102A-N may employ SDK 103 of the game session management service 100 to interact with the game session management service 100, for example via an API of the game session management service 100. For example, game server process 102A-N may use the designated communication interface 120 to issue API calls to the game session management service 100, via the SDK 103, such as including calls to indicate that a game server process 102A-N is ready to host game sessions, calls to end a game server process 102A-N, calls to activate a game session, calls to accept or remove a player session, and many others. Additionally, the game session management service 100 may use the designated communications interface to send communications to the game server processes 102A-N, such as to issue responses to any of the above or other API calls, to issue requests to start a game session, and many others. Thus, in some examples, the communicating at operation 520 may include sending, by the game session management service, via the designated communications interface, an instruction to start a game session on the game server process. Additionally, the communicating at operation 520 may include receiving, by the game session management service, via the designated communications interface, a call from the game server process to accept a player session or remove the player session. Furthermore, the communicating at operation 520 may include receiving, by the game session management service, via the designated communications interface, a notification from the game server process that the game server process is ending.

Figure 6:
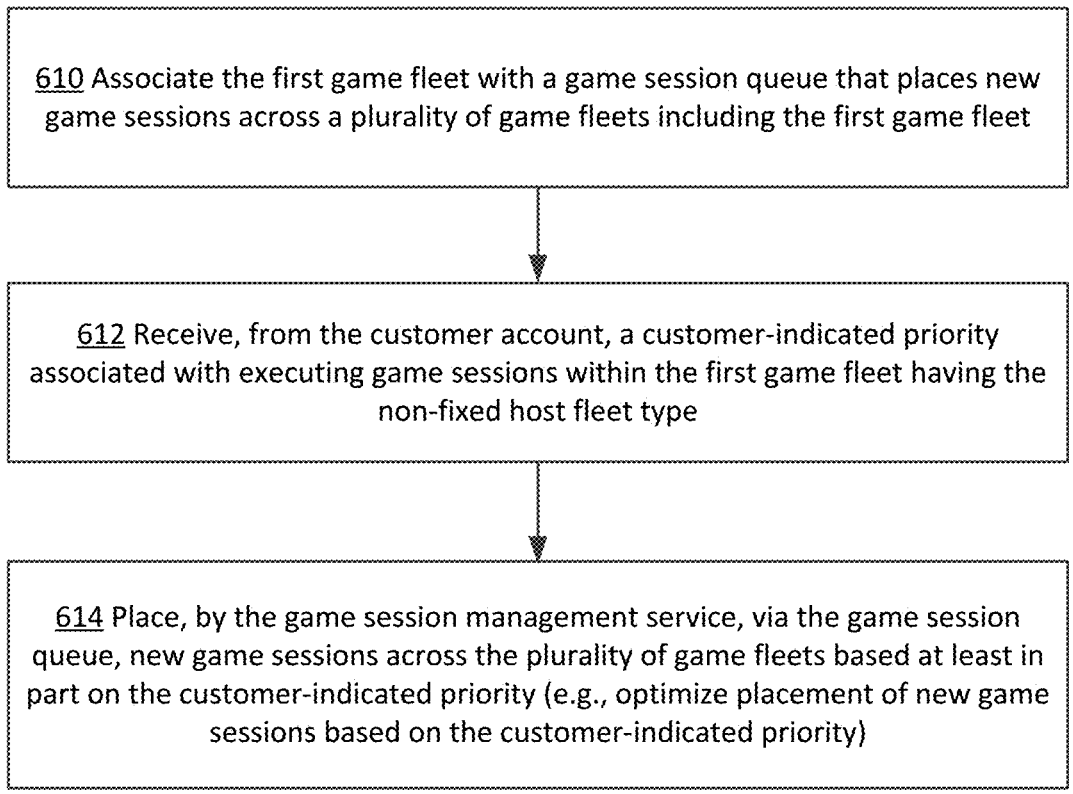
FIG. 6 is a flowchart illustrating an example video game session placement process that may be used in accordance with the present disclosure.

At operation 520, the process of FIG. 5 may optionally proceed to operation 610 of FIG. 6. Specifically, FIG. 6 is a flowchart illustrating an example video game session placement process that may be used in accordance with the present disclosure. It is noted that any, or all, of operations 610-614 of FIG. 6 may be performed by a game session management service. At operation 610, the first game fleet is associated with a game session queue that places new game sessions across a plurality of game fleets including the first game fleet. In some examples, the game session queue may place the new game session across a plurality of game fleets including the first game fleet having the non-fixed host fleet type and one or more other games fleet having the fixed host fleet type. In some examples, operation 610 may be performed by game session management service 100, such as based on a request from a customer. For example, a customer may issue a request to add the first game fleet to the game session queue, and the game management service may then associate the first game fleet with the game session queue based on this customer request. As described above with reference to FIG. 2, the game session management service 100 provides a game session queue 201 that allows game sessions to be placed globally across a fleet group 200. In the example of FIG. 2, the fleet group 200 includes fixed host fleets 115A-B and non-fixed host fleet 105. Players may join game sessions via game clients 204. Game session management service 100 provides matchmaking service 202, which may match players into new game sessions based on a defined set of matchmaking rules, such as may be defined by a customer of the game session management service 100. Matchmaking requests for the new players may be received by matchmaking service 202 via game backend service 203. When the matchmaking service 202 matches players into a new game session, a request for the new game session may be enqueued into game session queue 201. In some examples, the game session queue 201 may optimize game session placements across fleet group 200 based on a priority associated with factors such as cost, latency, resources available from the different fleets, and/or others.

At operation 612, a customer-indicated priority associated with executing game sessions within the first game fleet having the non-fixed host fleet type is received from the customer account. As described above with reference to FIG. 2, a customer may specify a customer-indicated priority 210 associated with executing game sessions on the non-fixed host fleet 105. This may allow game session queue 201 to optimize placement of game sessions based at least in part on factors such as cost, latency, resources available from the different fleets, and/or others. In one specific example, the customer may indicate priority by assigning a priority measure, such as a rank or weight, to the first game fleet as well as other game fleets within the plurality of game fleets. In another specific example, the priority may be based at least in part on cost, and the customer may indicate priority based on specifying a cost for executing game sessions within the first game fleet.

At operation 614, the game management service places, via the game session queue, new game sessions across the plurality of game fleets based at least in part on the customer-indicated priority. In some examples, operation 614 may include optimizing placement of the new game sessions across the plurality of game fleets based at least in part on the customer-indicated priority, for example based on factors such as cost and/or latency. In some examples, when optimizing based on priority, the game session management service may place new game sessions into the highest priority fleet with available capacity. Also, in some examples, a customer may prioritize factors for game session placement. For example, a customer may indicate that cost should be a highest priority and that latency should be a second highest priority. This may cause the game session management service to optimize first based on cost and then optimize based on latency between two fleets that have equal cost. In some other examples, a customer may indicate that latency should be a highest priority and that cost should be a second highest priority. This may cause the game session management service to optimize first based on latency and then optimize based on cost between two fleets that have equal latency.

Some examples of priority scenarios are described above with reference to FIG. 3. Specifically, priority assignment 301 represents a first scenario in which the customer may set the customer-indicated priority 210 for the non-fixed host fleet to be higher than the spot index priority 301 (for fixed host fleet 115A) and the on-demand instance priority 302 (for fixed host fleet 115B). This is represented in priority assignment 301 by showing the customer-indicated priority 210 on to the right of both the spot index priority 301 and the on-demand instance priority 302 (with priorities increasing from left to right). This may, for example, allow game sessions to be created on the non-fixed host fleet 105 when there is available capacity, and then allow overflow game sessions to be created on the fixed host fleets 115A-B when the non-fixed host fleet is at full capacity. In one specific example, prioritization may be based on cost, and priority assignment 301 may represent an example scenario in which it is less expensive to host game sessions on non-fixed host fleet than 105 than on fixed host fleet 115A (including spot instances) and on fixed host fleet 115B (including on-demand instances). Also, in this example scenario, the customer may specify the customer-indicated priority 210 by indicating that the non-fixed host fleet has a lower cost (and therefore a higher priority) than the fixed host fleets 115A-B. Priority assignment 302 represents a second scenario in which the customer may set the customer-indicated priority 210 for the non-fixed host fleet to be higher than the on-demand instance priority 302 (for fixed host fleet 115B)—but lower than the spot index priority 301 (for fixed host fleet 115A). This is represented in priority assignment 302 by showing the customer-indicated priority 210 to the right of the on-demand instance priority 302 and to the left of the spot index priority 301 (with priorities increasing from left to right). This may, for example, allow game sessions to be created on the fixed host fleet 115A (including spot instances) when there is available capacity, and then allow overflow game sessions to be created on the non-fixed host fleet 105. Additionally, when there is no available capacity on the fixed host fleet 115A or the non-fixed host fleet 105, additional overflow game sessions may then be created on the non-fixed host fleet 115B. In one specific example, prioritization may be based on cost, and priority assignment 302 may represent an example scenario in which it is less expensive to host game sessions on non-fixed host fleet than 105 than on fixed host fleet 115B (including on-demand instances)—but more expensive to host game sessions on non-fixed host fleet than 105 than on fixed host fleet 115A (including spot instances). Also, in this example scenario, the customer may specify the customer-indicated priority 210 by indicating that the non-fixed host fleet has a lower cost (and therefore a higher priority) than fixed host fleet 115B (including on-demand instances) but a higher cost (and therefore a lower priority) than fixed host fleet 115A (including spot instances).

Figure 7:
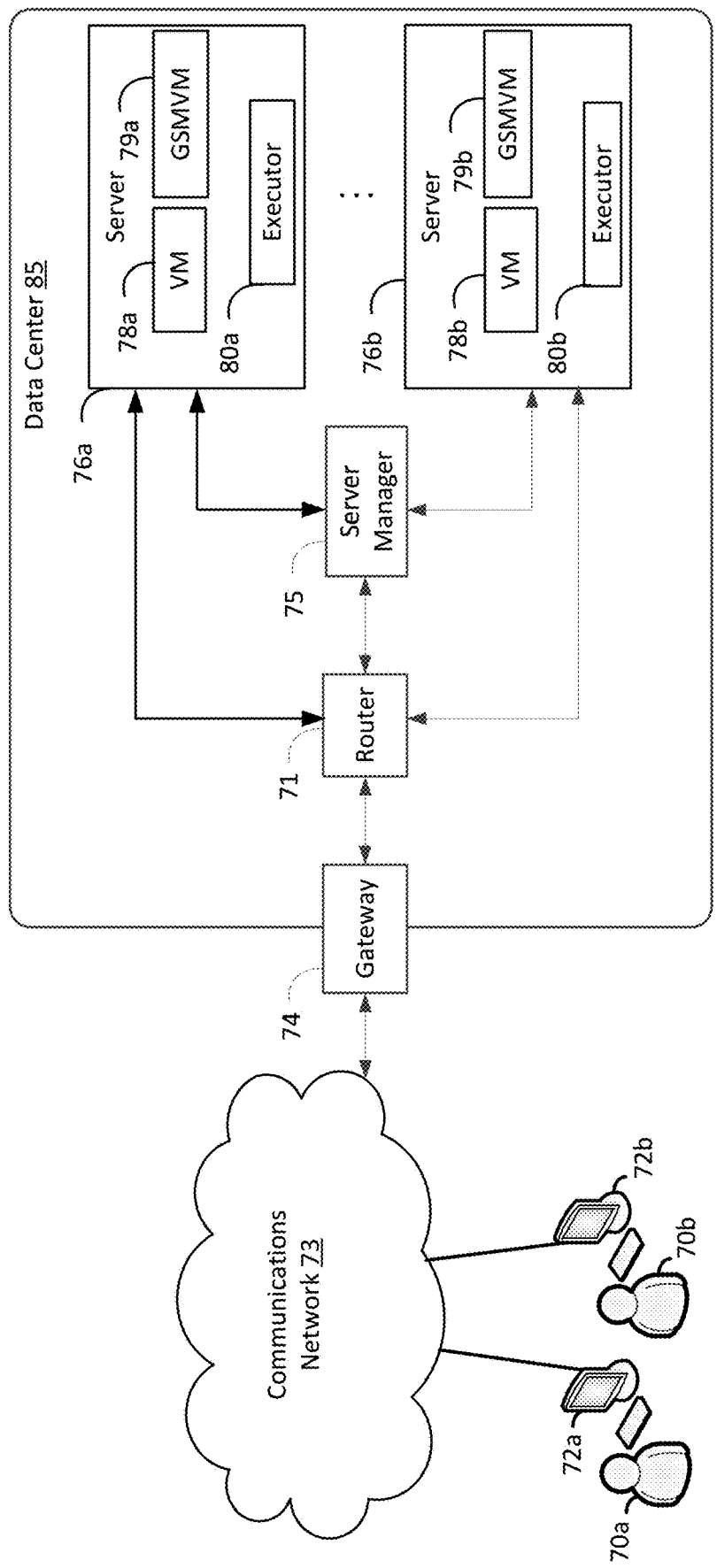
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include game session management virtual machines (GSMVM's) 79a-b, which are virtual machines that are configured to execute any, or all, of the video game session management techniques for non-fixed hosting topologies described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
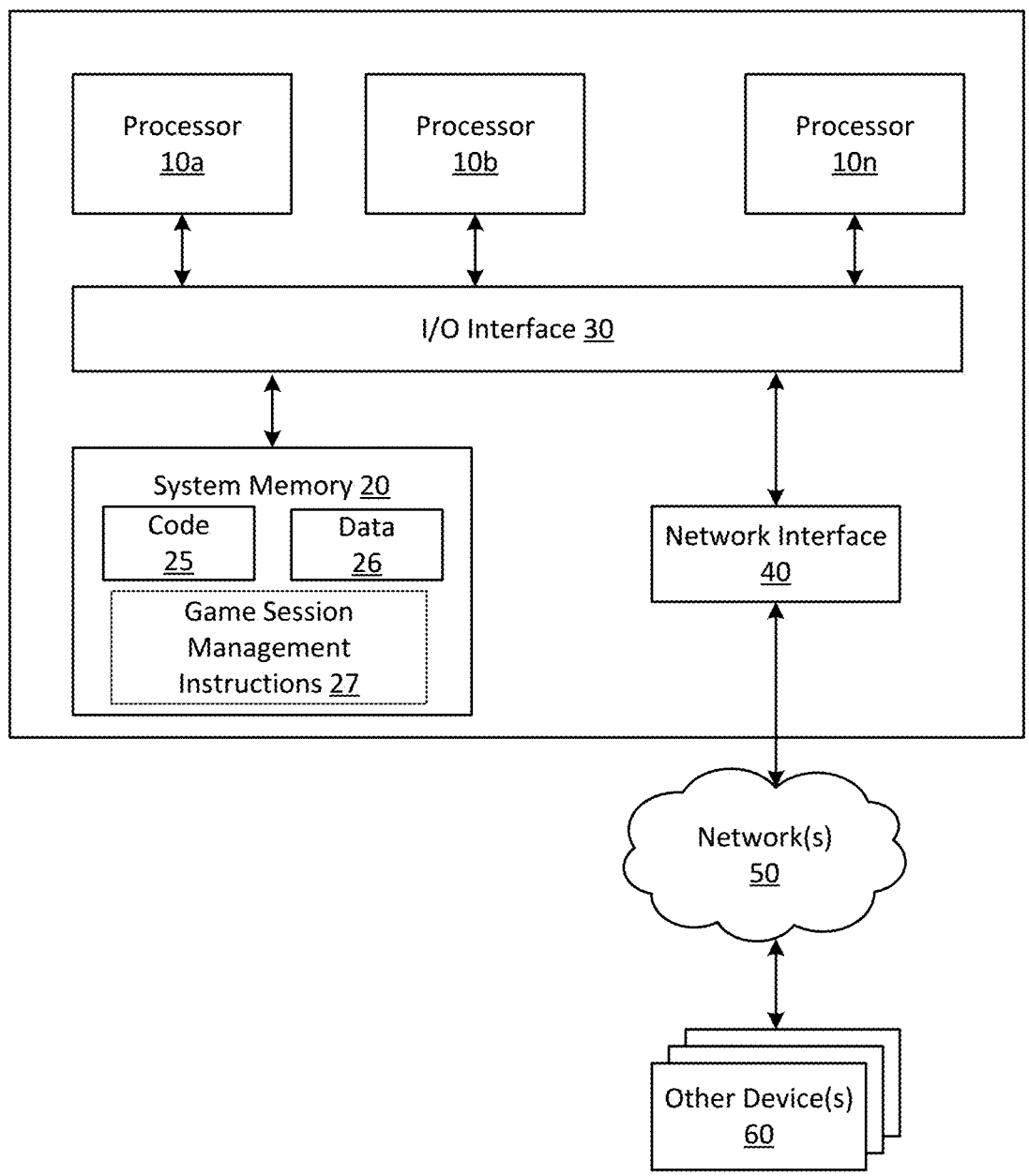
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes game session management instructions 27, which are instructions for executing any, or all, of the video game session management techniques for non-fixed hosting topologies described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform computing operations comprising:
receiving, by a game session management service, from a customer account, a first request to create a first game fleet, wherein the game session management service manages a fixed host fleet type and a non-fixed host fleet type, wherein the fixed host fleet type allows game server execution only on a fixed host topology of a computing service provider affiliated with the game session management service, wherein the non-fixed host fleet type allows the game server execution on any host topology, and wherein the first request indicates that the first game fleet has the non-fixed host fleet type;
receiving, by the game session management service, from the customer account, a host registration request to register a host to the first game fleet;
providing, by the game session management service, to the customer account, information regarding a designated communications interface for communications between the first game fleet and the game session management service;
receiving, by the game session management service, via the designated communications interface, a process registration request to register a game server process executing on the host; and communicating, by the game session management service, with game server process executing on the host via the designated communications interface.

2. The computing system of claim 1, wherein the operations further comprise:

associating the first game fleet with a game session queue that places new game sessions across a plurality of game fleets including the first game fleet.

3. The computing system of claim 2, wherein the operations further comprise:

receiving, from the customer account, a customer-indicated priority associated with executing game sessions within the first game fleet.

4. The computing system of claim 3, wherein the operations further comprise:

placing, by the game session management service, via the game session queue, new game sessions across the plurality of game fleets based at least in part on the customer-indicated priority.

5. A computer-implemented method comprising:

receiving, by a game session management service, from a customer account, a first request to create a first game fleet, wherein the game session management service manages a fixed host fleet type and a non-fixed host fleet type, wherein the fixed host fleet type allows game server execution only on a fixed host topology, wherein the non-fixed host fleet type allows the game server execution on any host topology, and wherein the first request indicates that the first game fleet has the non-fixed host fleet type;

receiving, by the game session management service, from the customer account, a host registration request to register a host to the first game fleet;

receiving, by the game session management service, via a designated communications interface, a process registration request to register a game server process executing on the host; and communicating, by the game session management service, with game server process executing on the host via the designated communications interface.

6. The computer-implemented method of claim 5, further comprising:

providing, by the game session management service, to the customer account, information regarding the designated communications interface for communications between the first game fleet and the game session management service.

7. The computer-implemented method of claim 5, further comprising:

associating the first game fleet with a game session queue that places new game sessions across a plurality of game fleets including the first game fleet.

8. The computer-implemented method of claim 7, wherein the game session queue places the new game session across the plurality of game fleets including the first game fleet having the non-fixed host fleet type and one or more other games fleets having the fixed host fleet type.

9. The computer-implemented method of claim 7, further comprising:

receiving, from the customer account, a customer-indicated priority associated with executing game sessions within the first game fleet.

10. The computer-implemented method of claim 9, further comprising:

placing, by the game session management service, via the game session queue, new game sessions across the plurality of game fleets based at least in part on the customer-indicated priority.

11. The computer-implemented method of claim 5, further comprising:

receiving, by the game session management service, from the customer account, a second request to create a second game fleet, wherein the second request indicates that the second game fleet has the fixed host fleet type.

12. The computer-implemented method of claim 5, wherein the communicating comprises sending, by the game session management service, via the designated communications interface, an instruction to start a game session on the game server process.

13. The computer-implemented method of claim 5, wherein the communicating comprises receiving, by the game session management service, via the designated communications interface, a call from the game server process to accept a player session or remove the player session.

14. One or more non-transitory computer-readable storage media having stored thereon computing instructions that, upon execution by one or more computing devices, cause the one or more computing devices to perform computing operations comprising:

receiving, by a game session management service, from a customer account, a first request to create a first game fleet, wherein the game session management service manages a fixed host fleet type and a non-fixed host fleet type, wherein the fixed host fleet type allows game server execution only on a fixed host topology, wherein the non-fixed host fleet type allows the game server execution on any host topology, and wherein the first request indicates that the first game fleet has the non-fixed host fleet type;

receiving, by the game session management service, from the customer account, a host registration request to register a host to the first game fleet;

receiving, by the game session management service, via a designated communications interface, a process registration request to register a game server process executing on the host; and communicating, by the game session management service, with game server process executing on the host via the designated communications interface.

15. The one or more non-transitory computer-readable storage media of claim 14, wherein the operations further comprise:

providing, by the game session management service, to the customer account, information regarding the designated communications interface for communications between the first game fleet and the game session management service.

16. The one or more non-transitory computer-readable storage media of claim 14, wherein the operations further comprise:

associating the first game fleet with a game session queue that places new game sessions across a plurality of game fleets including the first game fleet.

17. The one or more non-transitory computer-readable storage media of claim 16, wherein the operations further comprise:

receiving, from the customer account, a customer-indicated priority associated with executing game sessions within the first game fleet.

18. The one or more non-transitory computer-readable storage media of claim 17, wherein the operations further comprise:

placing, by the game session management service, via the game session queue, new game sessions across the plurality of game fleets based at least in part on the customer-indicated priority.

19. The one or more non-transitory computer-readable storage media of claim 14, wherein the communicating comprises sending, by the game session management service, via the designated communications interface, an instruction to start a game session on the game server process.

20. The one or more non-transitory computer-readable storage media of claim 14, wherein the communicating comprises receiving, by the game session management service, via the designated communications interface, a call from the game server process to accept a player session or remove the player session.

* * * * *